United States Patent [19]
Taipale

[11] Patent Number: 6,089,583
[45] Date of Patent: Jul. 18, 2000

[54] STABILIZER

[75] Inventor: Erkki Taipale, Tumba, Sweden

[73] Assignee: Scania CV Aktiebolag, Sweden

[21] Appl. No.: 09/233,668

[22] Filed: Jan. 19, 1999

[30] Foreign Application Priority Data

Jan. 16, 1998 [SE] Sweden .................................. 9800123

[51] Int. Cl.$^7$ .................................................. B60G 3/12
[52] U.S. Cl. ..................................... 280/124.13; 280/679
[58] Field of Search .................... 280/124.1, 124.104,
280/124.106, 124.107, 124.108, 124.109,
124.152, 124.166, 679, 684, 124.128, 124.13,
124.153

[56] References Cited

U.S. PATENT DOCUMENTS

| | | | |
|---|---|---|---|
| 3,149,690 | 9/1964 | Rosenkrands et al. .................... | 180/73 |
| 3,887,025 | 6/1975 | Kaltwasser ................................ | 180/73 |
| 4,153,272 | 5/1979 | Fiedler et al. ........................... | 280/689 |
| 4,334,697 | 6/1982 | Deweese ................................... | 280/689 |
| 4,434,998 | 3/1984 | Kaltwasser .............................. | 280/721 |
| 4,842,298 | 6/1989 | Jarvis ....................................... | 280/689 |
| 5,083,812 | 1/1992 | Wallace et al. .......................... | 280/713 |
| 5,118,070 | 6/1992 | Reid ......................................... | 248/635 |

*Primary Examiner*—Brian Johnson
*Assistant Examiner*—Tony Winner
*Attorney, Agent, or Firm*—Ostrolenk, Faber, Gerb & Soffen, LLP

[57] ABSTRACT

A stabilizer for vehicle with a framework incorporates a torsion bar which extends transversely to the longitudinal direction of the vehicle and is supported swivellingly relative to the framework of the vehicle by a first bearing in a first end region of the bar and a second bearing in a second end region of the bar. A first shank is non-swivellingly connected to the bar by a first connection, and a second shank which is non-swivellingly connected to the bar by a second connection. These shanks extend from the bar in substantially the longitudinal direction of the vehicle and are swivellingly connected to a wheel shaft arrangement of the vehicle. The longitudinal direction of the bar intersects the shanks at an oblique angle, at least in the regions of the connections between them. The shanks extend obliquely in a vertical direction at least in the regions of the connections to the bars or over the full extent of the shanks.

13 Claims, 3 Drawing Sheets

STABILIZER

BACKGROUND TO THE INVENTION, AND STATE OF THE ART

The present invention relates to a stabiliser for a vehicle frame.

Such a stabiliser has the purpose of preventing the superstructure of a vehicle from rolling relative to its substructure, e.g. when cornering and it is referred to in DE-A-3 730 338. When the vehicle tends to roll, the two shanks of the stabiliser twist and bend. The resulting difference in height between the ends of the respective shanks is accommodated by a rotary motion (torsion) in the bar extending between the shanks, which, owing to its inherent elastic characteristics, counteracts the twisting and hence also the rolling. Stabilisers of this kind have proven to have excellent stabilising characteristics, particularly in heavy-duty vehicles such as trucks, buses etc., but have a serious disadvantage in that the life of the shanks may, depending on their operating conditions, be significantly shorter than that of the torsion bar. This is very disadvantageous, since a shank fracture may have considerably more serious consequences than a torsion bar fracture.

The background to the problem is that these shanks are subject to large bending stresses when the vehicle rolls, because such rolling makes the wheel shaft swivel about a point and displace the shanks laterally in the region where they are connected to the wheel shaft. The shanks and the welded connections between them and the bar are also subject to tensile and bending stresses caused by vertical forces which occur when the vehicle rolls. If the shanks are to absorb lateral movements, they need a certain flexibility. If they are to have long life, they have also to be amply dimensioned. A conflict situation arises here in that the stronger the shanks, the less flexible they are. Manufacturers of known stabilisers of this type are therefore compelled in practice to use somewhat under-dimensioned shanks in order to provide sufficient flexibility. This results in the problem of the life of the shanks being generally shorter than that of the torsion bar.

SUMMARY OF THE INVENTION

The object of the present invention is to increase the life of the shanks of a stabiliser and increase the strength in the region between the shanks and torsion bar of the type of stabiliser mentioned in the introduction.

This object is achieved by a stabiliser, which is characterised in that the bar has a longitudinal direction which intersects the shanks at an oblique angle, at least in the region of the connections. This oblique angling of the shanks, i.e. the shanks being oblique to the bar and to one another, reduces the amplitude of stresses as rolling increases. In particular, it reduces the amplitude of stresses in the region of each shank's connection to the bar as compared with a shank which, as in the state of the art, includes a plane relative to which the bar extends in a perpendicular direction. The design according to the invention thus reduces the risk of the bending forces which act on the shanks leading to fracture, particularly in the area of their connection to the bar. As the forces acting on the shanks decrease when the solution according to the invention is employed, it is possible to lengthen the life of the shanks so that it becomes longer than, or at least as long as, the life of the torsion bar, without affecting shank dimensions and flexibility.

According to one embodiment of the invention, the shanks, as seen in a section transverse to the longitudinal direction of the vehicle, are arranged to extend in a direction which is oblique relative to a vertical direction, at least in the region of the first and second connections respectively. This oblique angling of the shanks, i.e. the shanks extending obliquely to a vertical direction, at least when the vehicle is in an unloaded state on a horizontal surface, reduces the aggregate amplitude of stresses.

According to a further embodiment of the invention, the shanks are arranged to extend obliquely along substantially their whole extent in the longitudinal direction of the vehicle. Shanks with such a form have increased bending resistance throughout their length. It is at the same time advantageous for each shank to be substantially planar. Such a planar form simplifies stabiliser manufacture and makes it possible for each shank to consist of a substantially planar long narrow flat element substantially less thick than the width of the shank.

According to a further embodiment of the invention, the shanks are obliquely angled so that said oblique direction of one shank intersects said oblique direction of the other shank at a point below the stabiliser as seen in said section. With such shanks converging downwards, each shank will move approximately parallel with the direction in which each shank is oblique during rolling, i.e. when the wheel shaft swivels. The bending resistance of the shanks will be greatest in this direction.

According to a further embodiment of the invention, each shank incorporates in the region of said connection a portion thicker than the remainder of the shank. This provides the possibility of increasing the bending resistance of the shanks.

According to a further embodiment of the invention, each shank is connected to the bar in the vicinity of a first shank end and is arranged to be swivellingly connected to said wheel shaft arrangement in the vicinity of the second shank end. At the same time, each shank may be swivellingly connected to said wheel shaft arrangement by means of a guide device which allows the shank to swivel in more than one plane. This guide device may be arranged on a retaining element which is connected permanently to said wheel shaft arrangement and is situated below said wheel shaft arrangement as seen in said section.

BRIEF DESCRIPTION OF THE DRAWINGS

The present invention will now be explained by means of an embodiment described by way of example with reference to the attached drawings, in which.

DETAILED DESCRIPTION OF AN EMBODIMENT OF THE INVENTION

Figure 1:
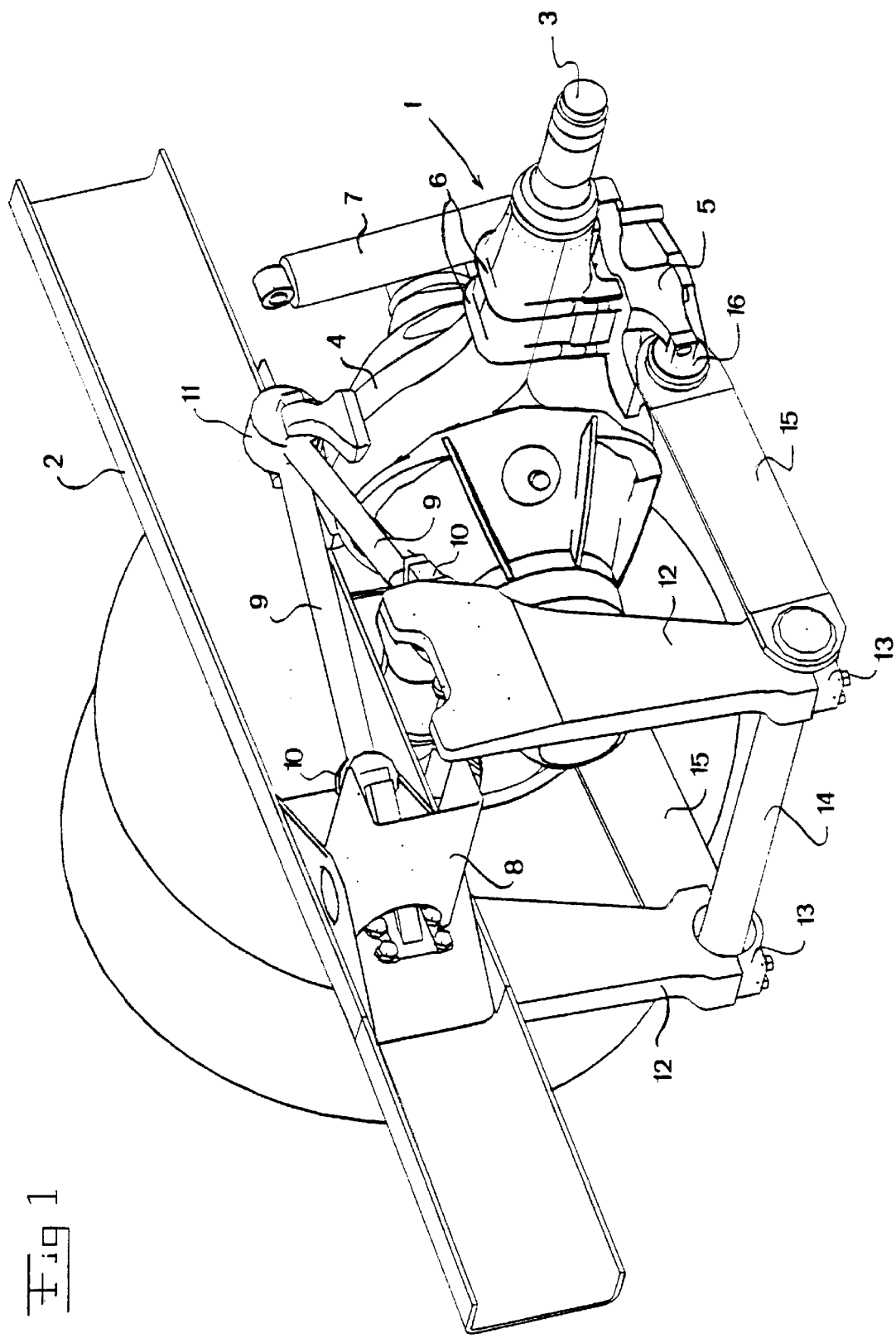
FIG. 1 shows a perspective view of part of a wheel suspension of a vehicle.

FIG. 1 shows part of a wheel suspension for a rear axle arrangement 1 of a motor vehicle and intended more particularly for a truck, a bus or some similarly heavy-duty vehicle. Although the embodiment depicted refers to a driven rear axle of such a heavy-duty vehicle, it should be noted that the invention is applicable to all wheel shafts of a vehicle and also to other types of wheeled vehicles.

In the embodiment depicted, the vehicle includes a framework with two frame members 2 which extend substantially parallel with one another in the longitudinal direction of the vehicle, only one of which is depicted in FIG. 1. The rear axle arrangement 1 thus includes a driven rear axle 3 and a centrally arranged rear axle drive accommodated in a gear housing 4. Two retaining elements 5 are arranged on the rear axle 1, one on either side of the gear housing 4. Each retaining element 5 is fastened to the rear axle arrangement I by means of two yoke elements 6 which extend round the rear axle arrangement 1. Each retaining element 5, which may take a wide variety of different forms, is further designed to make it possible to fit at least one resilient device, e.g. in the form of a pneumatic spring (not depicted), and a shock absorber 7. The resilient device and the shock absorbers 7 make it possible in a manner known per se for the rear axle arrangement 1 to move relative to the frame members 2.

The two longitudinal frame members 2 are connected to one another by means of cross-members 8, one of which is partly depicted in FIG. 1. At the same height as the partly depicted cross-member 8 there is a strut arrangement which incorporates two strut elements 9 in a "V" formation. Each strut element 9 has its rear end swivellingly connected to one of the frame members 2 by means of its respective fastening device 10, and its forward end swivellingly connected to the gear housing 4 of the rear axle arrangement 1 by means of a guide device 11 common to the two strut elements 9 and arranged on top of the gear housing 4. The strut arrangement depicted thus allows the rear axle arrangement 1 to move in a vertical direction while at the same time virtually fixing the rear axle arrangement 1 in the lateral and longitudinal directions of the vehicle. At the same time, both the fastening device 10 and the guide device 11 are designed to allow the strut elements 9 to swivel in a number of different planes, i.e. not only about an axis which extends at right angles to the longitudinal direction of the strut elements 9 but also about an axis which is parallel with the longitudinal direction of the strut elements 9, so that the rear axle arrangement 1 can also swivel about a central point, i.e. the rear axle arrangement 1 can roll.

Each frame member 2 has a fastening element 12 extending substantially vertically downwards from it. This fastening element 12 is arranged substantially centrally to the partly depicted cross-member 8, i.e. substantially centrally to the fastening devices 10 of the strut elements 9. Each fastening element 12 incorporates at its lower end a bearing device 13 which is designed to accommodate and support a stabiliser.

The stabiliser (see also FIGS. 2 to 6) incorporates an elongate torsion bar 14, which may be solid or tubular and which extends in a longitudinal direction x transverse to the longitudinal direction of the vehicle and is supported for rotation relative to the two frame members 2 by means of the bearing devices 13, which support the end regions of the torsion bar 14. The stabiliser further incorporates two shanks 15 which are connected non-swivellingly to the torsion bar 14 and extend forwards from the torsion bar 14 in substantially the longitudinal direction of the vehicle, i.e. substantially parallel with the frame members 2. Each of these shanks 15 has its rear end connected by its own connection to the torsion bar 14 in the respective end region of the latter. The forward end of each shank 15 is swivellingly connected to one of the abovementioned retaining elements 5 of the rear axle arrangement 1 by means of its respective guide device 16 which allows the respective shank 15 to swivel in more than one plane relative to the rear axle arrangement 1, i.e. each shank 15 can not only swivel about an axis which extends at right angles through the shank 15 but also swivel about an axis which extends substantially parallel with the shank 15.

Each shank 15 takes the form of a metal plate, i.e. a substantially planar long narrow metal element substantially less thick than the width of the shank 15.

Figure 2:
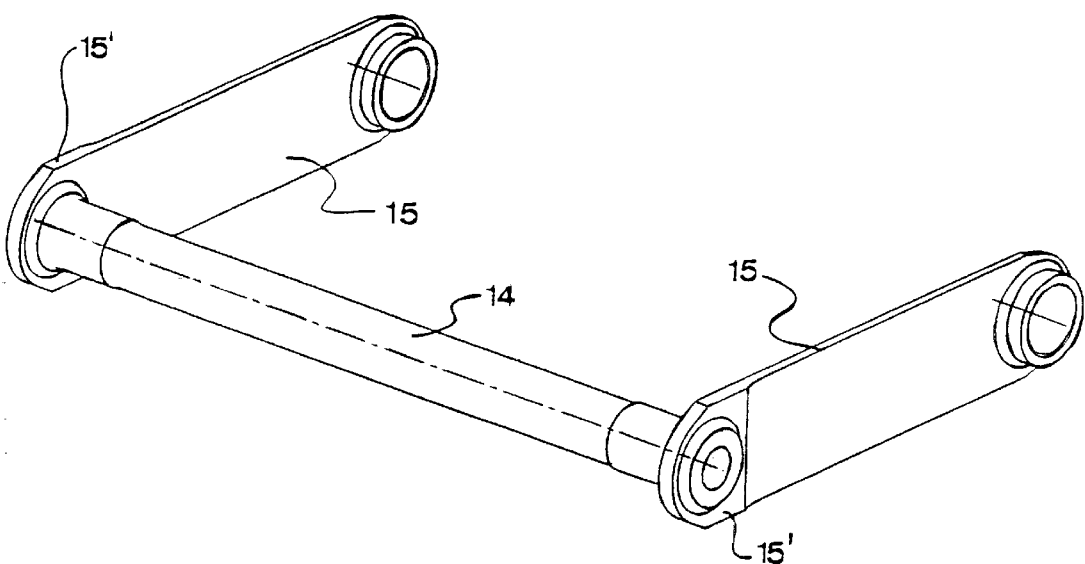
FIG. 2 shows a perspective view of a stabiliser according to the state of the art.
Figure 3:
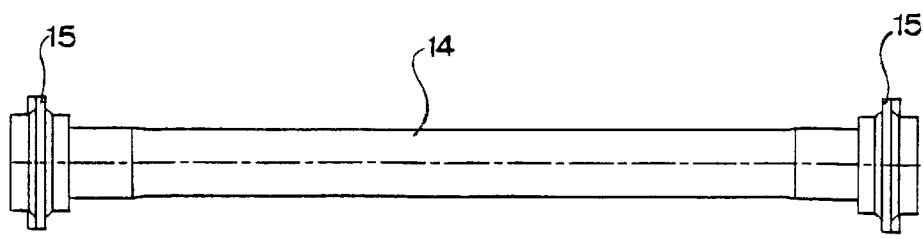
FIG. 3 shows a view from the front of the stabiliser in FIG. 2.

FIGS. 2 and 3 show a stabiliser according to the state of the art. In this case the shanks 15, as seen in a section transverse to the longitudinal direction of the vehicle, are substantially parallel with one another, i.e. the planes which include the length and width of the shanks 15 are substantially parallel and vertical. In the stabiliser depicted in FIGS. 2 and 3, each shank 15 is provided in the rear regeion with a portion 15' which is thicker than the remainder of the shank 15. These thickened shank portions 15' increase the strength and rigidity of the connections of the shank 15 to the torsion bar 14.

Figure 4:
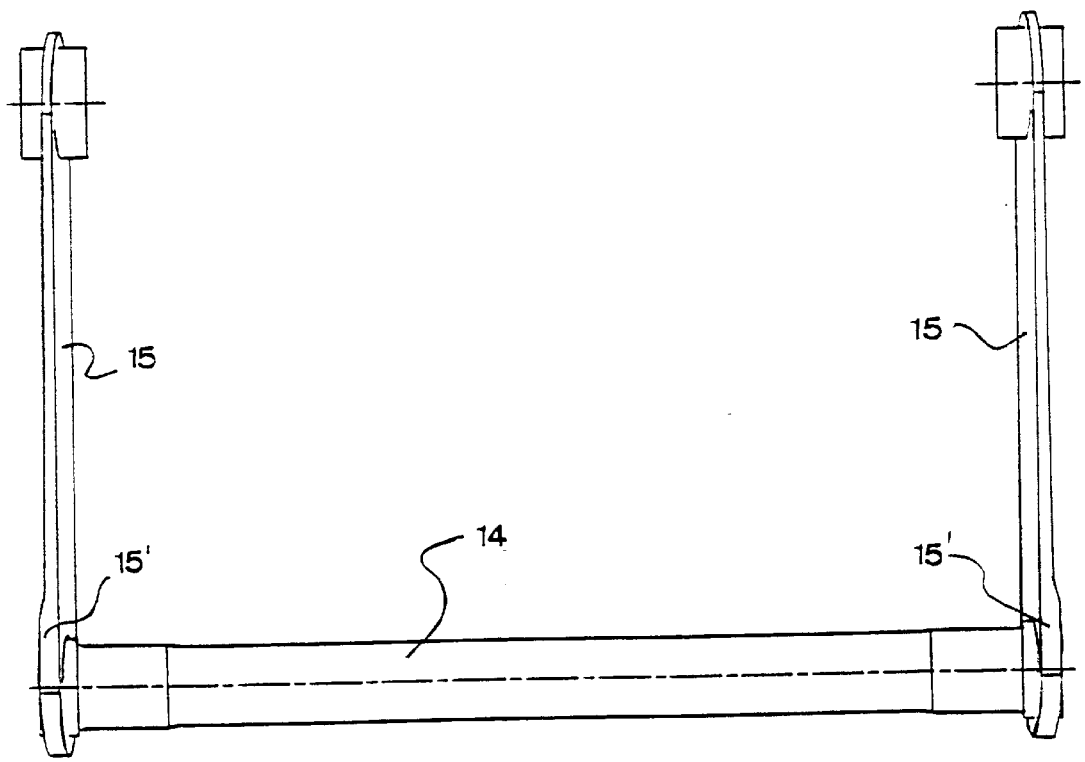
FIG. 4 shows a view from above of a stabiliser according to the invention.
Figure 5:
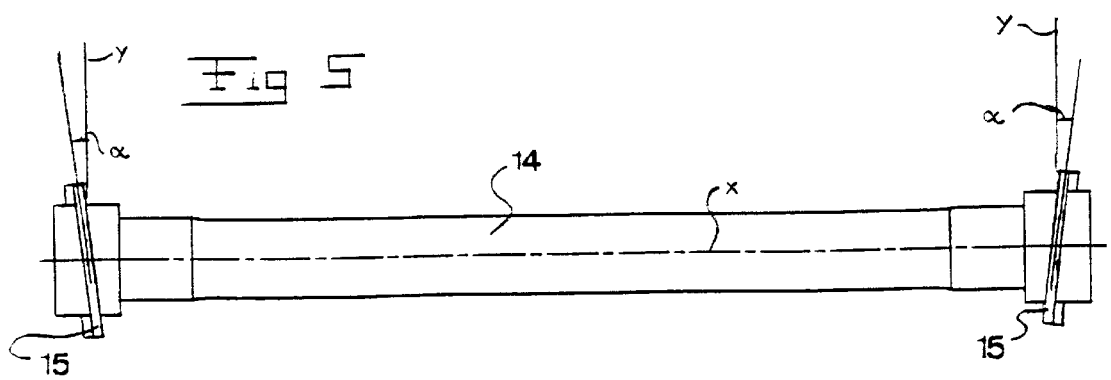
FIG. 5 shows a view from the front of a stabiliser in FIG. 4.
Figure 6:
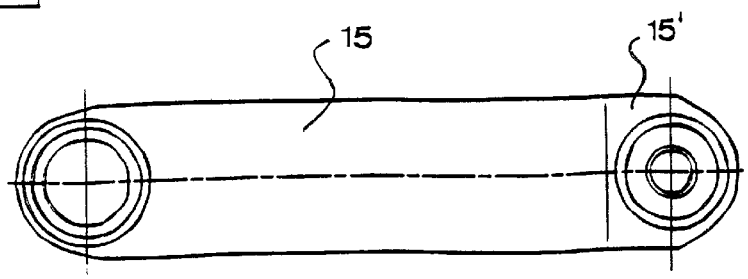
FIG. 6 shows a side view of the stabiliser in FIG. 4.

FIGS. 4 to 6 show a stabiliser according to the present invention. In this case the shanks 15, as seen in a section transverse to the longitudinal direction of the vehicle, extend in a direction which is oblique at an angle to a vertical direction y, i.e. the propagation planes of the shanks or, more precisely, the planes which include the length and width of the shanks 15, are oblique to one another, i.e. they converge towards a point which is situated below the stabiliser when the latter is in its fitted state and the vehicle is in an unloaded state on a horizontal surface. In other words, the longitudinal direction of the torsion bar 14 is oblique to the propagation planes of the shanks 15 by the angle. This oblique angling of the shanks reduces the amplitude of stresses as rolling increases. In particular, it reduces the amplitude of stresses in the region of the connection of each shank to the bar as compared with a shank which, as in the state of the art, includes a plane towards which the bar extends in the perpendicular direction. The design according to the invention thus reduces the risk of the bending forces which act on the shanks leading to fracture, particularly in the region of the connections of the shanks to the bar. As the forces which act on the shanks decrease when the solution according to the invention is employed, it is possible to lengthen the life of the shanks so that it will be longer than, or at least as long as, the life of the torsion bar, without affecting shank dimensions and flexibility.

In accordance with the embodiment depicted, the shanks 15 also extend obliquely in their forward region where they are connected to the guide devices 16. Within the scope of the invention, the angle is larger than 0°, may for example be smaller than 30° and is preferably between 5 and 15°. The absolute value of the angle is preferably the same for both of the shanks 15. On the stabiliser depicted in FIGS. 4 to 6, each shank 15 is also provided in its rear region with a portion 15' which is thicker than the remainder of the shank 15 in order to increase its strength and rigidity and hence the total life of the stabiliser.

The present invention is not limited to the embodiment described above but may be varied and modified within the scope of the following patent claims. According to the invention it is not necessary for the shanks to be planar or for them to extend obliquely along substantially the whole of their extent. It is possible for the shanks 15 to be bent or twisted in design so that they only exhibit said oblique angling in the regions where they are connected to the torsion bar 14. It is also possible for the shanks 15 to be designed so that their upper portions are oblique to the centre point of the torsion instead of extending obliquely, as depicted in FIG. 5, from the centre point of the bar.

What is claimed is:

1. A stabilizer for a vehicle, wherein the vehicle has a framework which extends in a longitudinal direction of the vehicle and has a wheel shaft extending transversely of the longitudinal direction of the vehicle and is supported to the framework;

the stabilizer comprising:

an elongate bar extending transversely to the longitudinal direction of the vehicle, the bar being spaced from the wheel shaft;

a first bearing and a second bearing at spaced apart locations along and attached to the bar, the first and second bearings being also attached to the framework, whereby the bar is supported by the first and second bearings to the framework;

a first shank extending in the longitudinal direction of the vehicle, a first connection at which the first shank is non-swivellingly connected to the bar; a second shank also extending in the longitudinal direction of the vehicle, a second connection spaced along the bar from the first connection at which the second shank is non-swivellingly connected to the bar; and the first and second shanks being swivellingly connected to the wheel shaft;

the shanks being oriented, at least in the region of the first and second connections, so that the bar extending transversely to the longitudinal direction of the vehicle intersects each of the shanks at a respective oblique angle at least in the region of the respective first and second connections.

2. The stabilizer of claim 1, wherein the bar has opposite first and second end regions, the first bearing and the first connection being at the first end region of the bar; and the second bearing and the second connection being at the second end region of the bar.

3. The stabilizer of claim 1, wherein, in a section taken transversely to the longitudinal direction of the vehicle, each of the shanks is arranged to extend in a direction which is oblique to a vertical direction, at least in the region of the first and second connections of the shanks, respectively.

4. The stabilizer of claim 1, wherein, in a section taken transversely to the longitudinal direction of the vehicle, each of the shanks is arranged to extend in a direction which is oblique to a vertical direction, along substantially the entire length of the shanks in the longitudinal direction of the vehicle.

5. The stabilizer of claim 4, wherein each shank is a substantially planar element.

6. The stabilizer of claim 1, wherein each shank is a substantially planar element.

7. The stabilizer of claim 4, wherein the shanks are respectively obliquely angled so that the oblique direction of each shank, would, if extended, intersect the oblique direction of the other shank at a point below the stabilizer, as seen in the transverse section.

8. The stabilizer of claim 3, wherein the shanks are respectively obliquely angled so that the oblique direction of each shank, would, if extended, intersect the oblique direction of the other shank at a point below the stabilizer, as seen in the transverse section.

9. The stabilizer of claim 1, wherein the shanks are respectively obliquely angled so that the oblique direction of each shank, would, if extended, intersect the oblique direction of the other shank at a point below the stabilizer, as seen in the transverse section.

10. The stabilizer of claim 3, wherein in the regions of the stabilizer at the respective first and second connections, each of the shanks being thicker in that region, than along the remainder of the shank.

11. The stabilizer of claim 3, wherein each shank has opposite first and second shank ends, wherein the first shank end is the end thereof non-swivellingly connected to the bar, and the second shank end is the end thereof swivellingly connected to the wheel shaft.

12. The stabilizer of claim 11, further comprising a guide device at the wheel shaft for each of the shanks and the second shank ends being so connected to the guide devices and the guide devices permitting each of the shanks to swivel with respect to the respective guide devices in more than one plane.

13. The stabilizer of claim 12, further comprising a retaining element on which the guide device is arranged, the retaining element being further connected to the wheel shaft and the guide device being situated below the wheel shaft as seen in transverse section.

* * * * *